(12) United States Patent
Carlowitz et al.

(10) Patent No.: US 9,566,547 B2
(45) Date of Patent: Feb. 14, 2017

(54) METHOD FOR THE TREATMENT OF EXHAUST GASES CONTAINING ORGANOSILICON COMPONENTS OR ACCOMPANYING SUBSTANCES, AND APPARATUS THEREFOR

(75) Inventors: Otto Carlowitz, Clausthal-Zellerfeld (DE); Bernd Ruskamp, Bayreuth (DE); Olaf Neese, Clausthal-Zellerfeld (DE); Frank Kriebisch, Sierksrade (DE)

(73) Assignee: CLAUSTHALER UMWELTTECHNIKINSTITUT GMBH (CUTEC-INSTITUT), Clausthal-Zellerfeld (DE)

( * ) Notice: Subject to any disclaimer, the term of this patent is extended or adjusted under 35 U.S.C. 154(b) by 846 days.

(21) Appl. No.: 13/327,905

(22) Filed: Dec. 16, 2011

(65) Prior Publication Data
US 2013/0156653 A1    Jun. 20, 2013

Related U.S. Application Data

(62) Division of application No. 10/596,351, filed as application No. PCT/DE2004/002685 on Dec. 7, 2004, now Pat. No. 8,105,562.

(30) Foreign Application Priority Data

Dec. 9, 2003    (DE) .................. 103 57 696

(51) Int. Cl.
  *B01D 53/72*    (2006.01)
  *B01D 53/34*    (2006.01)
(52) U.S. Cl.
  CPC ............ *B01D 53/343* (2013.01); *B01D 53/72* (2013.01); *B01D 2257/556* (2013.01)

(58) Field of Classification Search
  None
  See application file for complete search history.

(56) References Cited

U.S. PATENT DOCUMENTS

| | | |
|---|---|---|
| 3,870,474 A | 3/1975 | Houston |
| 4,535,551 A | 8/1985 | Groeneveld et al. |
| 4,940,567 A | 7/1990 | Ohlmeyer et al. |

(Continued)

FOREIGN PATENT DOCUMENTS

JP    2002-061822    2/2002

OTHER PUBLICATIONS

United States Environmental Protection Agency. Air Pollution Control Technology Fact Sheet. Regenerative Incinerator. Date Unknown. pp. 1-5; https://www3.epa.gov/ttncatc1/dir1/fregen.pdf.*

(Continued)

*Primary Examiner* — Walter D Griffin
*Assistant Examiner* — Jelitza Perez
(74) *Attorney, Agent, or Firm* — Whitham, Curtis & Cook, P.C.

(57) ABSTRACT

The invention relates to a method and an apparatus for treating exhaust gases comprising organosilicon components or accompanying substances. The invention more specifically relates to the use of bulk regenerator materials as storage materials allowing periodic removal, purification, and redelivery to the system. The invention solves the problem of clogged regenerator-storage materials during regenerative post-combustion of exhaust gases containing organosilicon components.

16 Claims, 7 Drawing Sheets

(56) References Cited

U.S. PATENT DOCUMENTS

| | | |
|---|---|---|
| 5,217,373 A | 6/1993 | Goodfellow |
| 5,571,491 A | 11/1996 | Thunstrom |
| 5,891,411 A | 4/1999 | Gribbon |
| 2007/0128092 A1* | 6/2007 | Carlowitz et al. ............ 422/222 |

OTHER PUBLICATIONS

Translation of JP 2002-061822, Feb. 2002.

* cited by examiner

METHOD FOR THE TREATMENT OF EXHAUST GASES CONTAINING ORGANOSILICON COMPONENTS OR ACCOMPANYING SUBSTANCES, AND APPARATUS THEREFOR

CROSS-REFERENCE TO RELATED APPLICATIONS

This application is a divisional of U.S. Ser. No. 10/596,351 filed Jun. 9, 2006 now U.S. Pat. No. 8,105,562 which is a 371 of PCT/DE04/02685 filed Dec. 7, 2004.

The present invention relates to a method and an apparatus for the treatment of exhaust gases containing organosilicon components and accompanying substances. More precisely, the present invention relates to a method for the regenerative postcombustion of exhaust gases containing organosilicon components, in which bulk storage materials (also referred to below as bulk regenerator materials) are periodically removed from the system, purified and recycled. Furthermore, the present invention relates to a system which permits automatic removal, purification and introduction (refilling) of the bulk storage materials in the regenerator.

PRIOR ART

Methods and apparatuses for the thermal purification of oxygen-containing or non-oxygen-containing exhaust gases are known, exhaust gases being fed to a combustion chamber heated, for example, by means of natural gas and being oxidized. If non-oxygen-containing exhaust gases are used, the supply of an additional oxidizing agent (e.g. air) is required. Such apparatuses and methods are generally referred to as thermal exhaust gas purification or thermal postcombustion. They serve, for example, for purifying the exhaust air from finishing, coating or printing operations which is laden with solvent vapors, i.e. for converting the solvents and other generally organic substances by oxidation into the nontoxic compounds carbon dioxide and steam if, for technical or economic reasons, recovery is not possible.

For economical operation of such an apparatus, use of waste heat is provided in by far the most cases. This may both serve for the generation of process heat and have the aim of reducing the fuel demand of the exhaust gas purification apparatus by preheating the exhaust gas to be treated. Extremely high exhaust gas preheating temperatures and hence low fuel consumption can be realized by so-called regenerative exhaust gas preheating based on cyclically switchable ceramic storage beds. For distinguishing from the conventional mode of operation using a tube-bundle-based exhaust gas preheater (recuperator) which is generally known by the term TPC plant (Thermal Post-Combustion), an RPC plant (Regenerative Post-Combustion) or RTO plant (Regenerative Thermal Oxidation) is referred to here.

In numerous processes (e.g. regranulation of plastics, plastics compounding processes, coating processes, drum reconditioning, treatment of plastics wastes for utilization, landfills, MBA plants), however, exhaust gases which contain, inter alfa, organosilicon components form. In this case, use of the RPC technology has been prevented up until now by the fact that the regenerator storage materials are amorphously coated with the oxidation product (predominantly $SiO_2$) from the organosilicon compounds and thus become clogged. The periodically necessary maintenance requires the manual dismantling of the usually monolithic storage materials (honeycombs), individual cleaning (steam jet) and manual reinstallation. This effort is not acceptable both with regard to the working conditions and with regard to the labor involved. In this context all manufacturers of RPC plants have to date ruled out the treatment of organosilicon compounds in their technical offer documents.

However, the adhesions of silica occur not only in RPC plants but also in conventional thermal postcombustion plants with recuperative exhaust air preheating. However, complete clogging does not always occur here, but here too cases are known in which plant shutdowns and damage due to excessive temperature have occurred within a short time due to silica adhesions.

The term "organosilicon compounds" is defined in the literature inter alia as follows: "in the narrower sense, a designation for those compounds which contain direct silicon-carbon bonds. There are . . . also compounds in which the carbon is linked to the silicon via oxygen, nitrogen or sulfur atoms".

Organosilicon compounds occur in particular in the following areas:
  silicon surfactants as foam stabilizers in plastics
  silicones as lubricants for plastics processing, in hand protection ointments, fragrances, toothpaste, etc.
  as silicone elastomers, silicone enamel, silicone fats, silicone gum, silicone resins, silicone oils, silicone rubber, silicone impregnating agents, etc.
  organofunctional silanes as adhesion promoters
  organooxysilanes and siloxanes as synthetic lubricants, crosslinking agents in cold rubbers, etc.

Organosilicon compounds are furthermore used as food additives, special cleaning agents, paper and textile coatings, color additives, etc.

The prior art therefore discloses no plants and processes which permit treatment of exhaust gases containing organosilicon compounds with the aid of regenerative exhaust gas preheating.

Starting from this, it is the object of the invention to provide a method and an apparatus which permits the use of the RPC technology and of the TPC technology also in the case of organosilicon exhaust gas components and greatly simplifies the handling of the adhesions.

BRIEF DESCRIPTION OF THE INVENTION

The underlying object was achieved by initially allowing adhesion to the bulk regenerator materials and removing the coated bulk regenerator materials periodically, according to requirements, purifying them and reintroducing them. This step can optionally be carried out in an automated manner.

The aim of the present invention is therefore to provide a method for exhaust gas purification with regenerative exhaust air preheating, the exhaust gases containing organosilicon components. This method comprises that the heat storage material comprising a bed initially retains, as a filter, the silica formed by oxidation of the organosilicon compounds and the bed is periodically removed from the regenerator or from the regenerators, worked up and recycled to the system.

The invention furthermore relates to an apparatus for the thermal purification of an oxygen-containing or non-oxygen-containing exhaust gas which contains inter alia organosilicon compounds, characterized in that the apparatus comprises a bulk material discharge, a separation apparatus and a bulk material feed.

DETAILED DESCRIPTION OF THE INVENTION

The present invention relates to a method for the treatment of exhaust gases containing organosilicon components or accompanying substances. This method is characterized in that the storage materials of the regenerator are easily removed from the system, are purified in a separation apparatus and are recycled to the regenerator.

The storage material is at least partly a bed, a bulk material, such as, for example, spheres, e.g. solid or hollow spheres. The bulk material can preferably consist of ceramic or steel. Other materials which can be used as bulk material include: pebbles, expanded clay, larva and similar materials which have the same effect as that mentioned above. In one embodiment, the storage material may consist only of bulk material. In another embodiment, the storage material contains at least 20%, e.g. 30%, 40% or 50%, such as 60%, 70%, 80% or 90% of bulk material.

The removal, purification and recycling step can be effected automatically or semiautomatically. The method is preferably characterized in that the regenerative preheating and cooling as well as the oxidation of the exhaust gas are effected within a regenerator bed which is operated alternately with upward and downward flow. If necessary, a flushing cycle with the aid of intermediate storage of the exhaust gas can be carried out.

According to the invention, two or more regenerator beds which are connected to a separation space and through which flow takes place alternately are used in the method, each of these regenerator beds being equipped with an apparatus for removal and introduction (refilling) of the heat storage material. The purification or separation can be effected in a common separation apparatus or in separate separation apparatuses.

The removal, purification and the introduction of the heat storage material can be effected at successive times in the individual regenerators.

In a preferred embodiment, the time of working up the storage material is determined by measuring the flow resistance of the exhaust air flowing through. When a maximum permissible pressure drop of the plant is exceeded, reprocessing of the storage materials then takes place. Alternatively, the heat storage material can be purified after certain time intervals, for example during a downtime at the weekend.

In a further embodiment, the regenerator may consist not completely but only partly of a removable bed. This region of the bed is present in the sections which are referred to as reaction zones or as combustion space.

In regions of the exhaust air regenerator or clean gas regenerator, the storage material may also consist of conventional components, such as honeycombs.

Furthermore, the method according to the invention does not require complete regenerative exhaust gas preheating; rather the exhaust gas preheating can also be brought about by another route, such as a recuperative route.

The optionally additionally required energy can be introduced by admixing natural gas into the exhaust gas, electrically, via a burner or by injecting gas into the combustion space.

The apparatus according to the invention therefore comprises, in addition to the known design of an RPC or TPC plant or RTO plant, a discharge which is mounted on each regenerator; the bed can be removed from the regenerator through this discharge and can be fed to a separation apparatus. This separation apparatus separates $SiO_2$ deposits from the bulk material. For example, at least some of the adhesions are detached by friction. Alternatively the deposits can be detached by pressure spraying or ablative methods. The separation apparatus is a conventional separation apparatus, such as a sieve, which is well known to the person skilled in the art in this area.

The purified bulk storage material is then recycled to the regenerator through a feed, optionally via a transport device.

The apparatus may comprise one regenerator or a plurality of regenerators. Each of these regenerators has a discharge and a feed for the bulk material.

Figure 1:
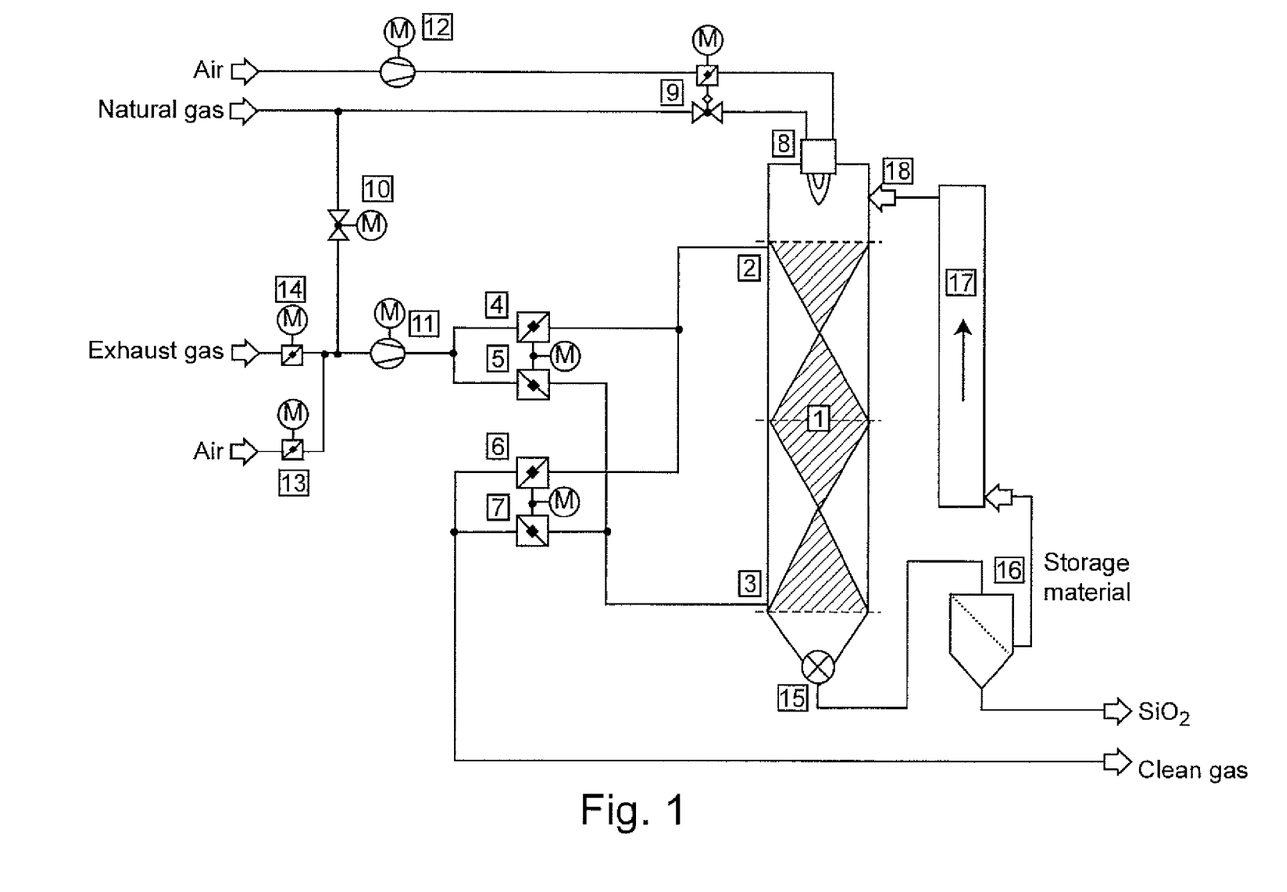
FIG. 1 a schematic diagram which shows an apparatus according to the invention for the oxidative purification of exhaust gases containing organosilicon compounds and regenerative exhaust gas preheating, which is in the form of a one-tower system.

The main components of an embodiment of the apparatus according to the invention are shown in FIG. 1. The key plant component then is the regenerator tower which is filled with a bed comprising heat storage material. Arranged at the top and bottom in each case are inlets and outlets (2, 3) for the exhaust gas and clean gas, respectively, which permit alternate flow through the regenerator tower from bottom to top (upward flow) or from top to bottom (downward flow) via a butterfly valve system (4 to 7) by means of cyclic switching. For heating up the plant, a burner (8) which is supplied with natural gas and air via corresponding control valves (interconnection, 9) is installed at the top of the regenerator. During the exhaust gas purification mode of the plant the energy required in the case of low loadings of the exhaust is supplied with the aid of a feed of the gaseous additional fuel directly into the exhaust gas (10), and the burner (8) is switched off. For purification of the bed material this can be removed via a discharge (15) below the regenerator and, after passing through a separation apparatus (16), is refilled (18) by means of a transport device (17) above the bed.

The different operating phases of the apparatus are shown schematically in FIGS. 2 to 6. There the respective active material flows are characterized with directional arrows.

Figure 2:
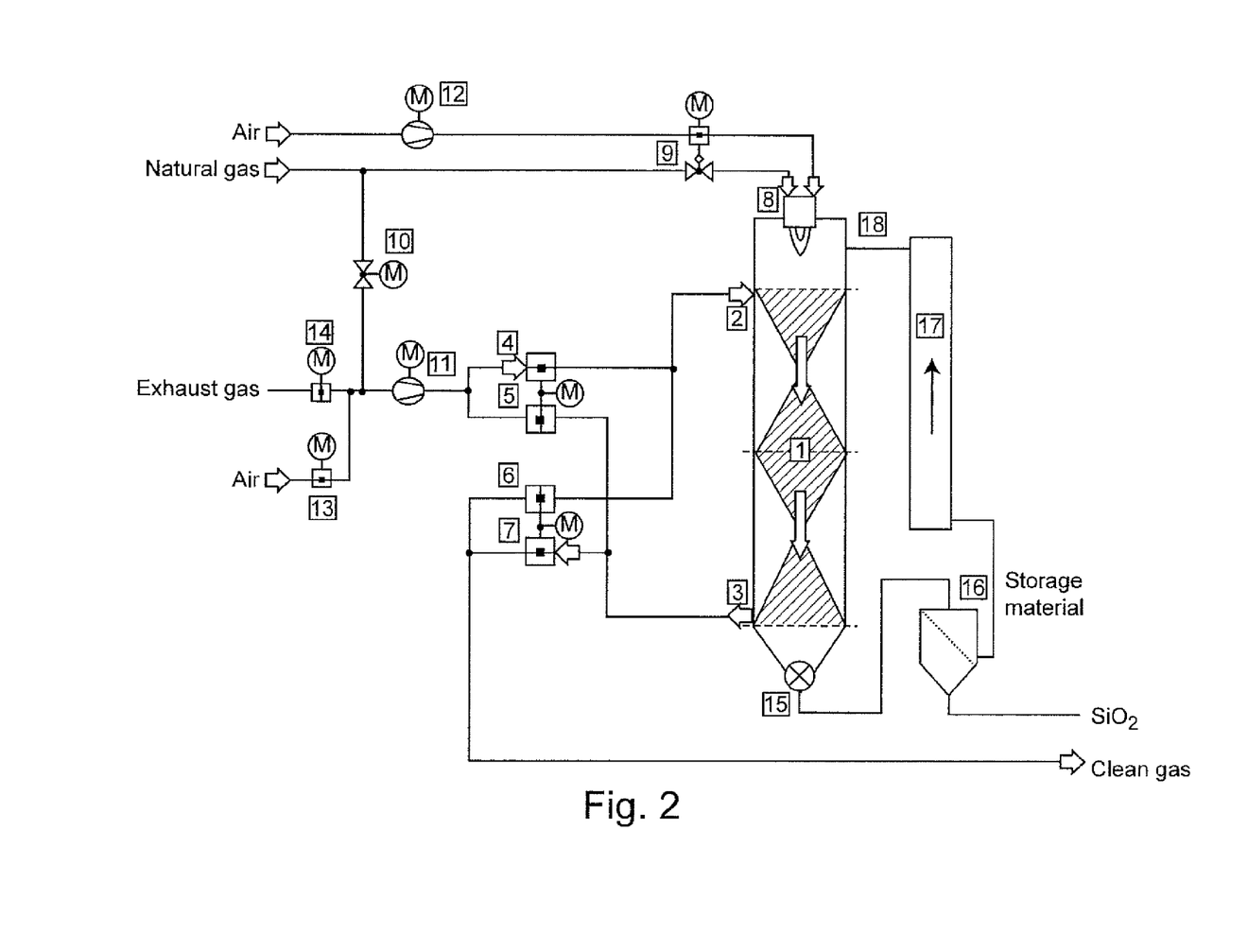
FIG. 2 shows the apparatus according to FIG. 1 in the operating phase of heating up.

In the heat-up mode corresponding to FIG. 2 the regenerator bed (1) is first heated with the aid of the burner (8). The supply of the combustion air delivered by means of a fan (12) is regulated in association with the natural gas (control valves 9) as a function of the combustion space temperature. The heat-up process ends when the upper part of the regenerator bed (1) is heated to a sufficient temperature. Thereafter, the temperature maximum is driven into the middle of the regenerator by a special switching program of the valves (4 to 7). For this purpose fresh air is passed through the plant via the main fan (11) with butterfly valve (13) opened and butterfly valve (14) closed, which fresh air is treated with natural gas in a controlled manner via valve (10) for maintaining the temperature. The burner (8) is switched off during this procedure.

After the heat-up phase is complete, the plant goes over into normal operation. For this purpose, the fresh air supply (13) is closed and the exhaust gas laden with organosilicon constituents (butterfly valve 14) is switched on. During normal operation, a distinction can be made between the operating states of downward flow (FIG. 3) and upward flow (FIG. 4). The corresponding temperature curves over the reaction route are shown in simplified form in FIG. 5.

Figure 3:
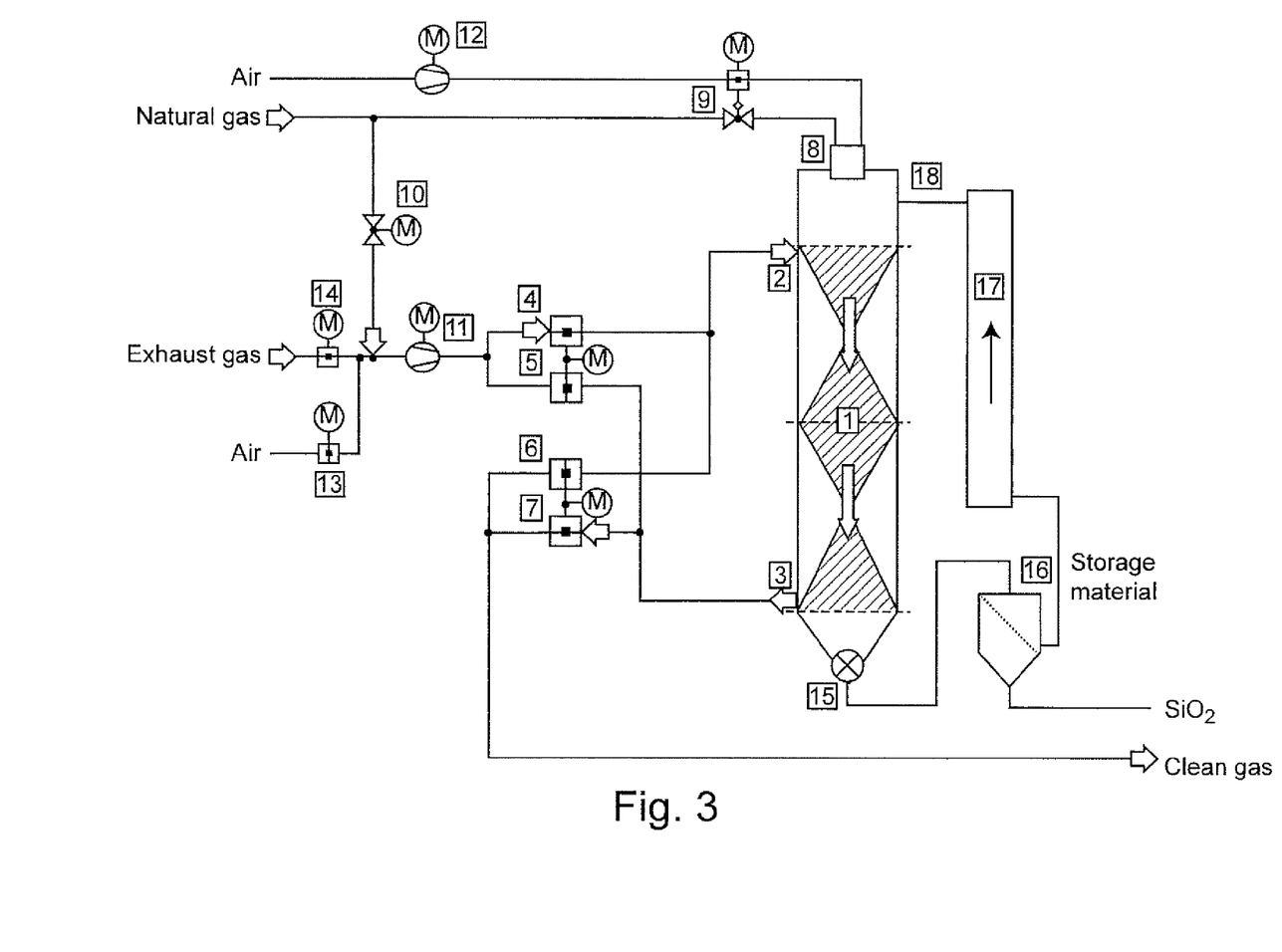
FIG. 3 shows the apparatus according to FIG. 1 in the operating phase of downward flow.
Figure 4:
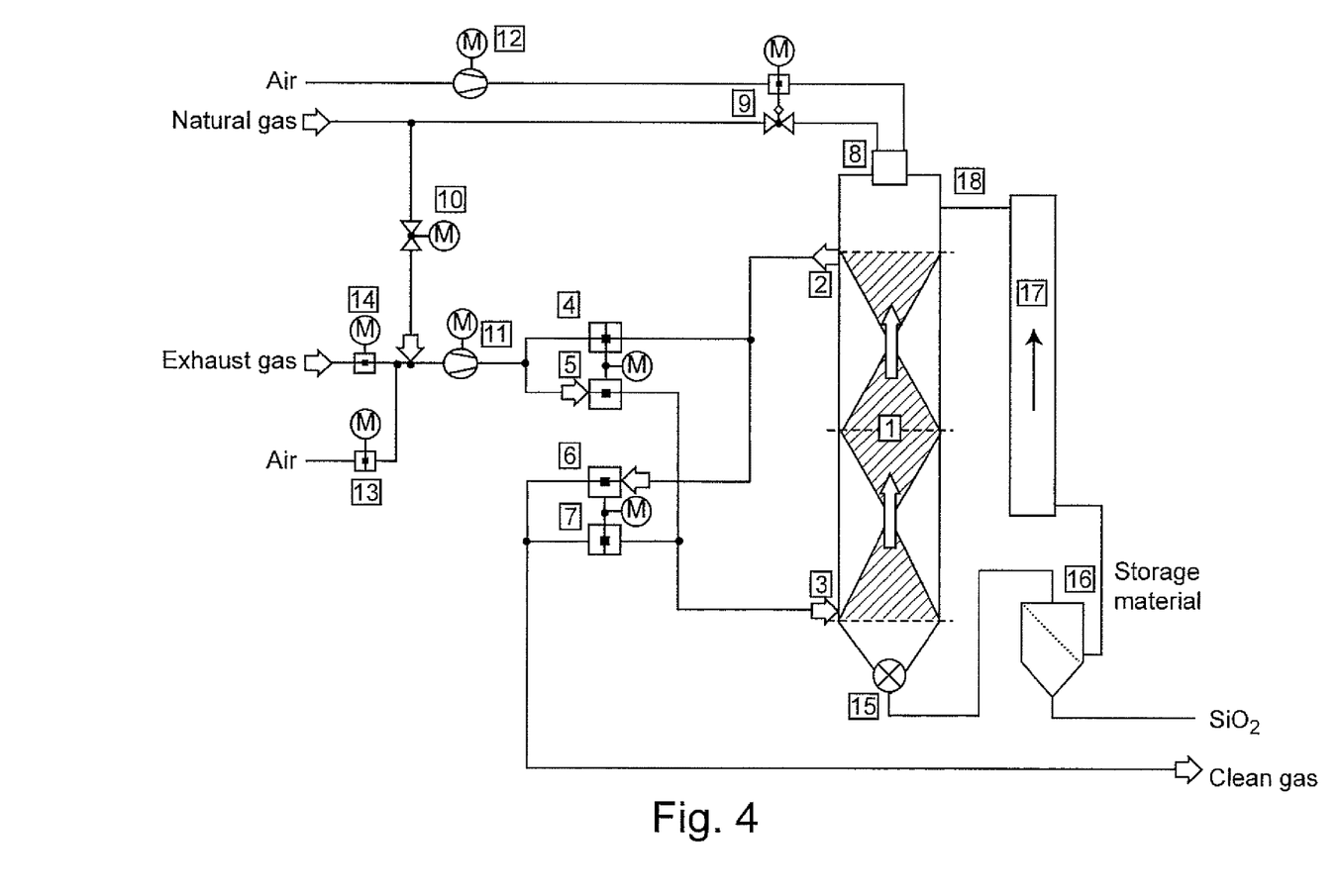
FIG. 4 shows the apparatus according to FIG. 1 in the operating phase of upward flow.
Figure 5:
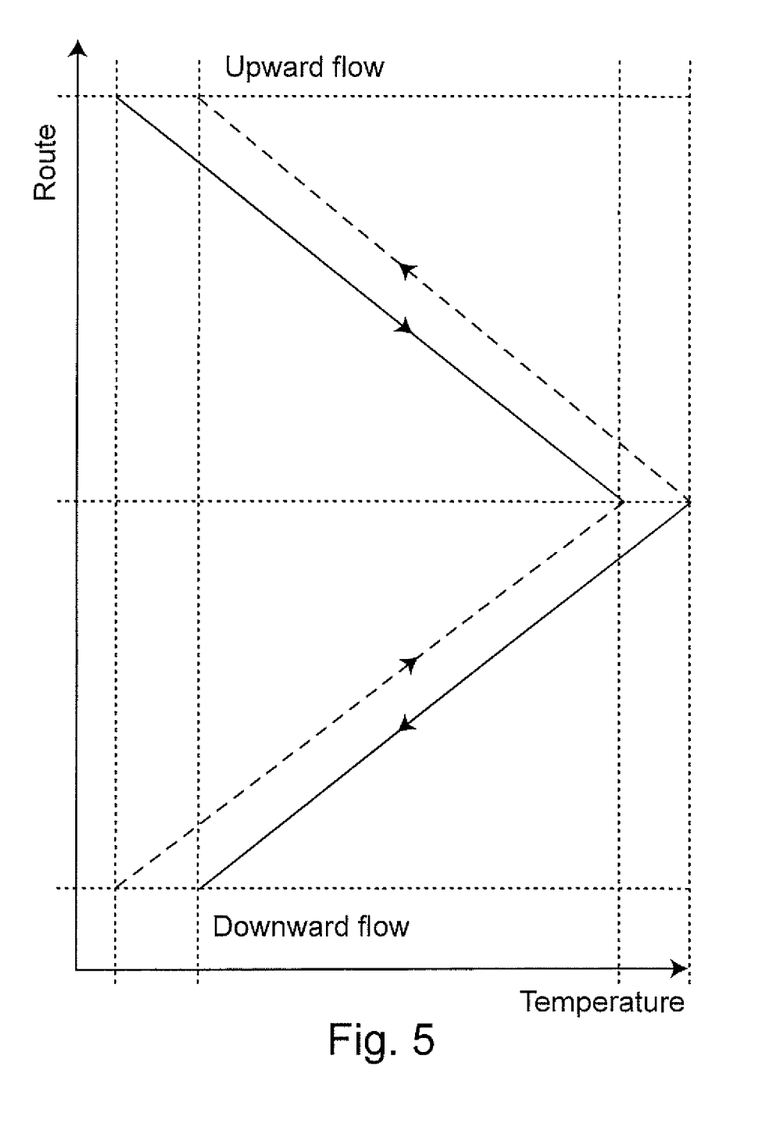
FIG. 5 shows, in simplified form, the temperature curve in the regenerator of an apparatus according to FIG. 1 in the operating phases of upward and downward flow.
Figure 6:
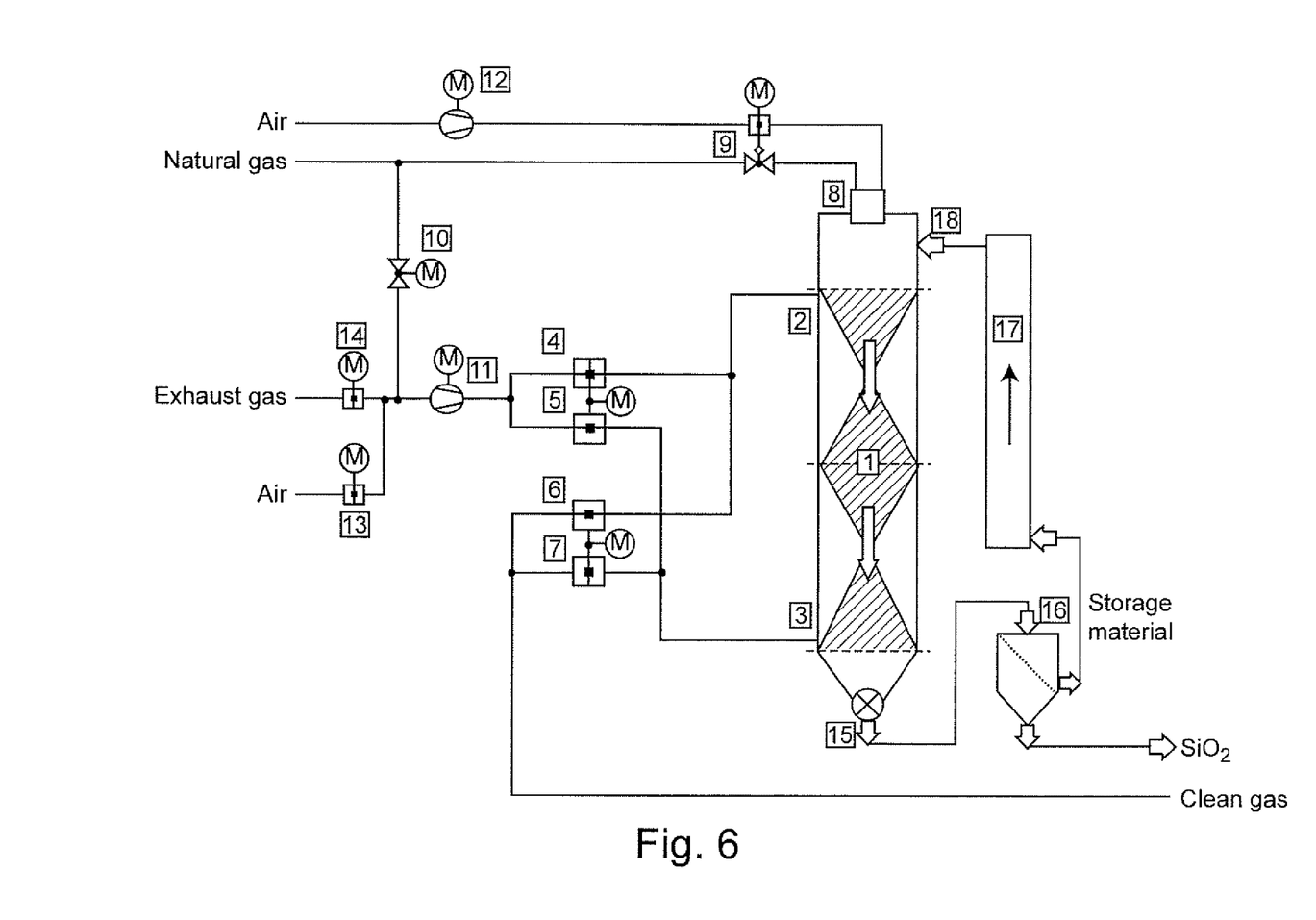
FIG. 6 shows the function of bed purification of the apparatus according to FIG. 1.

During downward flow, the exhaust gas is, according to FIG. 3, fed (2) to the regenerator from the top via the opened butterfly valve 4 (butterfly valve 5 closed) and flows downward through said regenerator. The exhaust gas is heated approximately to the middle of the regenerator and the organic substances present therein oxidize (temperature jump). The oxidation product $SiO_2$ of the organosilicon compounds forms amorphous adhesions on the heat storage material and is thus retained. In the further course of the flow, the clean gas releases its heat again to the storage material before it leaves the regenerator again at the bottom (3) and is passed via the opened butterfly valve 7 (butterfly valve 6 closed) to the chimney.

After a defined time, switching to the operating state of upward flow (FIG. 4) is effected. The exhaust gas now flows via the opened butterfly valves 5 and 6 (butterfly valves 4 and 7 closed) from bottom (3) to top (2) through the regenerator. The temperature curve shown by dashed lines in FIG. 5 results, once again the silica adhesions intentionally occurring approximately in the middle part of the regenerator. The two operating states of downward and upward flow are passed through cyclically in sequence.

For maintaining the reaction temperature, natural gas is again added to the exhaust gas (control valve 10) and the burner remains switched off. For avoiding switching peaks of the clean gas emissions of organically bound carbon ($C_{org.}$), temporary storage of the exhaust gas, not shown here for the sake of clarity, can be employed.

In the course of time, the silica adhesions increasingly build up within the ceramic storage material so that there is increased flow resistance. This can be detected by a differential pressure measurement, cleaning of the bed being effected in a preferred embodiment after a maximum pressure drop value is exceeded. For this purpose, the bed is cooled in a controlled manner in a pause in operation (e.g. at the weekend) and is put into the operating state of bed cleaning according to FIG. 6. The bed material including the resulting adhesions is removed via the discharge (15) and fed to a separation apparatus (16), some of the adhesions flaking off directly as a result of the relative movements between, for example, the packings (e.g. solid or hollow spheres of ceramic or steel). The remaining $SiO_2$ adhesions are separated from the storage material in the separation apparatus, while the purified storage material passes via a transport device (17) back into the regenerator (18). After bed cleaning is complete, the plant is heated up again and goes over into the exhaust gas purification mode.

Essential to the invention is the procedure initially to permit the silica adhesions formed from the oxidation of the organosilicon compounds within the regenerator and to remove the storage material, such as the bed, discontinuously depending on requirements (e.g. exceeding of pressure difference) and to recycle it in purified form to the plant.

In the concept of the invention, numerous modifications and further developments are possible, which relate, for example, to the discharge apparatus, the embodiment of the storage material or the arrangement of the regenerators.

Figure 7:
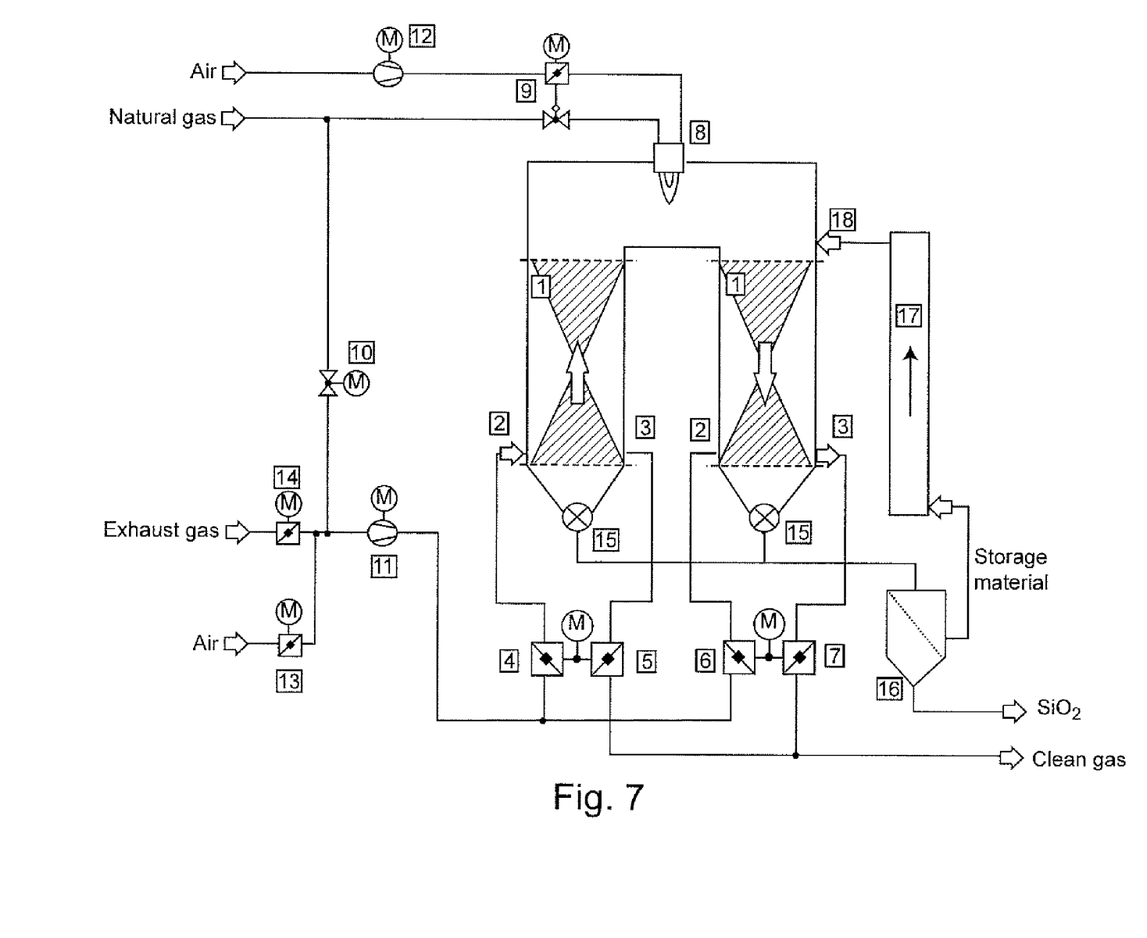
FIG. 7 shows an embodiment of the apparatus according to FIG. 1 as a two-tower system.

FIG. 7 schematically shows, for example, a variant of the apparatus according to the invention, comprising two separate regenerator chambers. Here, the preheating of the exhaust gas is effected in one regenerator, while the second regenerator is heated with the clean gas stream. The oxidation of the pollutants in the exhaust gas begins within the first regenerator and final combustion can take place under conditions which can be set in a defined manner (residence time, temperature) in the combustion space arranged above the regenerators. The purification of the bed material is carried out analogously to the procedure according to FIG. 6 in the two regenerators simultaneously or optionally in succession (displaceable transport and separation device, as shown in FIG. 7). The installation of a third regenerator for realizing flushing prior to treatment with clean gas is also possible in the concept of the invention.

In addition, the invention can also be applied to adhesions within RPC plants which were formed in a manner other than by oxidation of organosilicon compounds. Furthermore, the present invention can also be used in TPC plants in which exhaust gases, the organosilicon components or accompanying substances are treated.

The invention claimed is:

1. An apparatus for treatment of an exhaust gas which contains organosilicon compounds, wherein said apparatus is a regenerative thermal oxidizer, comprising:
   at least one regenerator;
   a heat storage material at least a portion of which is in the form of a bulk material selected from the group consisting of solid or hollow spheres of ceramic, solid or hollow spheres of steel, pebbles, expanded clay, and larva which forms a bed in the at least one regenerator on which adhesions from oxidation of said organosilicon compounds are formed;
   a discharge for removing at least a portion of said bulk material of said bed from said regenerator after said adhesions are formed on said bulk material from oxidation of said organosilicon compounds;
   a separation device for removing adhesions from said at least a portion of said bulk material; and
   a feed for re-introducing the at least a portion of said bulk material into the regenerator to refill the bed after adhesions are removed from said at least a portion of said bulk material.

2. The apparatus as claimed in claim 1, further comprising a transport device arranged between the separation device and the feed.

3. The apparatus as claimed in claim 1 wherein the bulk material consists of solid or hollow spheres.

4. The apparatus as claimed in claim 1 wherein said at least one regenerator includes two or more regenerators.

5. The apparatus of claim 1 wherein said separation device functions to detach adhesions by friction.

6. The apparatus of claim 1 wherein said separation device functions to detach adhesions by pressure spraying or ablative methods.

7. The apparatus of claim 1 wherein said separation device includes a sieve.

8. The apparatus of claim 1 wherein said discharge includes a discharge from said at least one regenerator.

9. The apparatus of claim 1 wherein said feed includes a feed to said at least one regenerator.

10. A system for handling exhaust gases that contain organosilicon compounds, wherein said system includes a regenerative thermal oxidizer, comprising:
    one or more regenerators which receive exhaust gases containing organosilicon compounds, wherein at least one of said one or more regenerators includes a heat storage material at least a portion of which is in the form of a bulk material selected from the group consisting of solid or hollow spheres of ceramic, solid or hollow spheres of steel, pebbles, expanded clay, and larva which forms a bed in the at least one of said one or more regenerators on which adhesions from oxidation of said organosilicon compounds are formed;

a discharge for said at least one of said one or more regenerators which discharges at least a portion of said bulk material of said bed from said at least one of said one or more regenerators, said discharge being operable after said adhesions are formed on said bulk material from oxidation of said organosilicon compounds;

an adhesion remover which receives said at least a portion of said bulk material from said discharge, and removes said adhesions formed on said bulk material; and a feed for recycling said at least a portion of said bulk material from said adhesion remover to at least one of said one or more regenerators.

11. The system of claim 10 wherein the bulk material consists of solid or hollow spheres.

12. The system of claim 10 wherein said one or more regenerators includes a plurality of regenerators.

13. The system of claim 12 wherein a plurality of said plurality of regenerators includes said heat storage material at least a portion of which is in the form of said bulk material.

14. The system of claim 13 wherein said feed recycles said at least a portion of bulk material to more than one regenerator.

15. The system of claim 13 wherein said discharge discharges from more than one regenerator.

16. The system of claim 10 wherein the feed includes a transport device.

* * * * *